June 7, 1932.  E. H. KOCHER  1,862,482
LUBRICATING INSTALLATION AND APPARATUS
Filed March 10, 1926  2 Sheets-Sheet 1
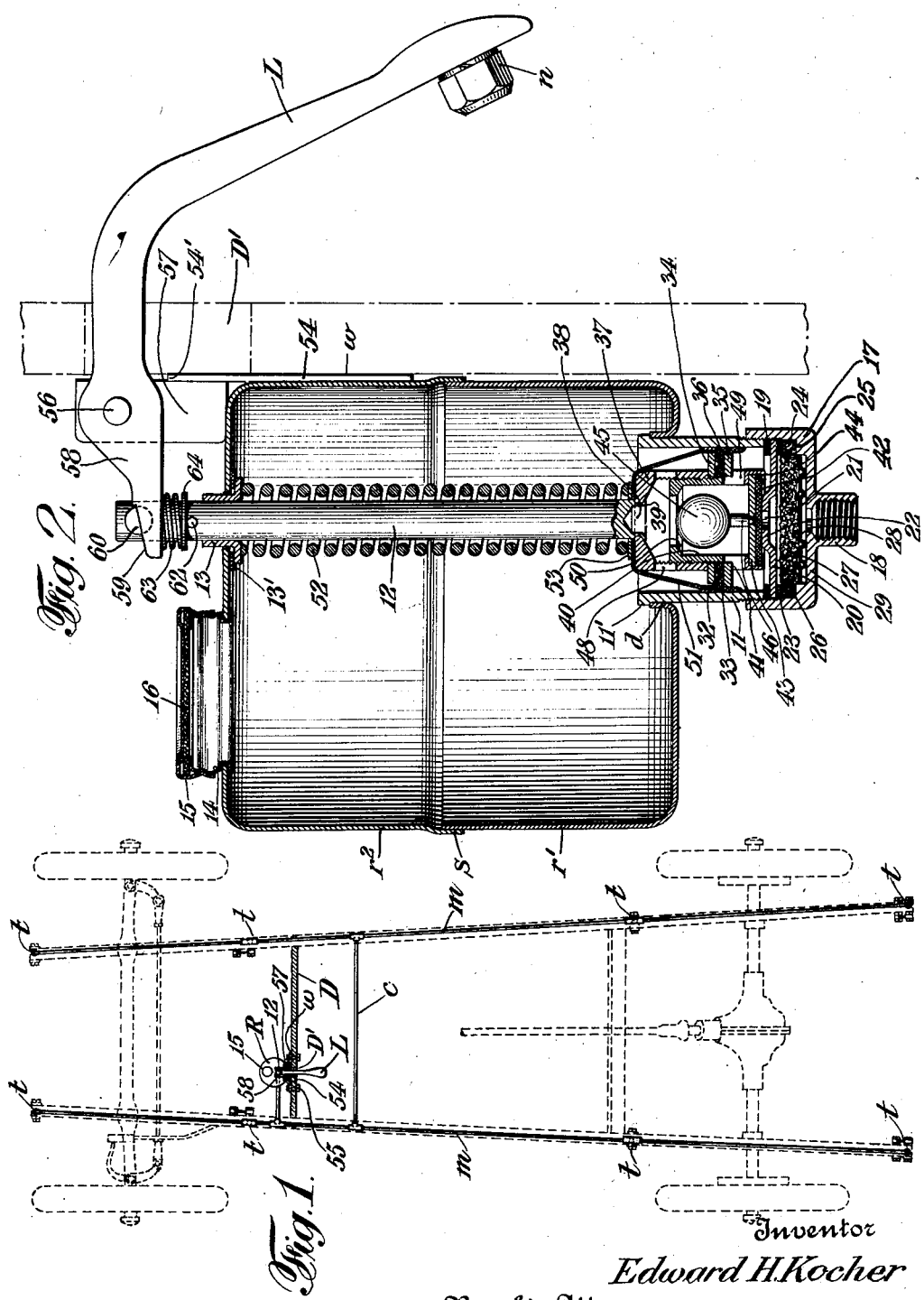
Inventor
Edward H. Kocher
By his Attorneys

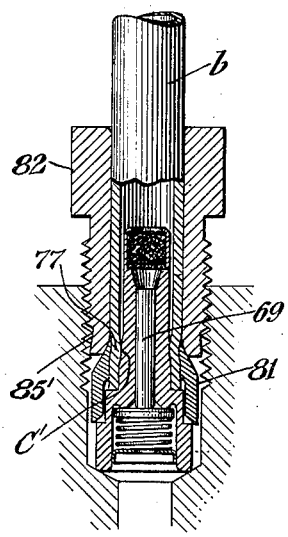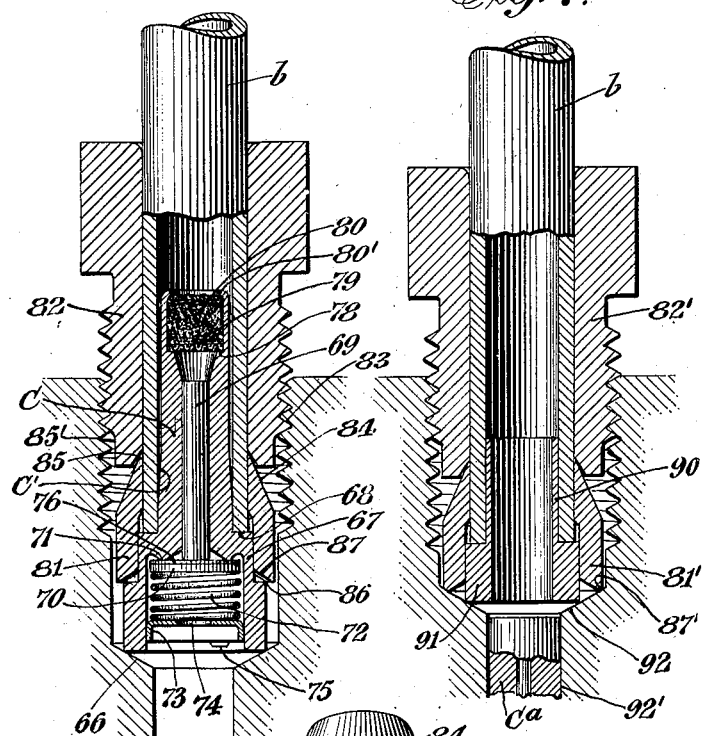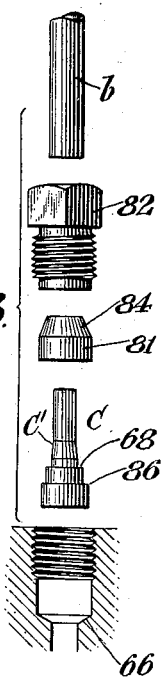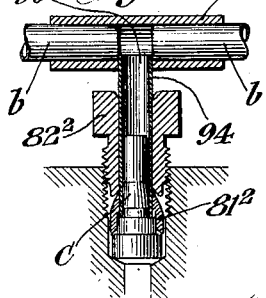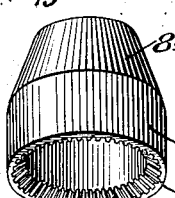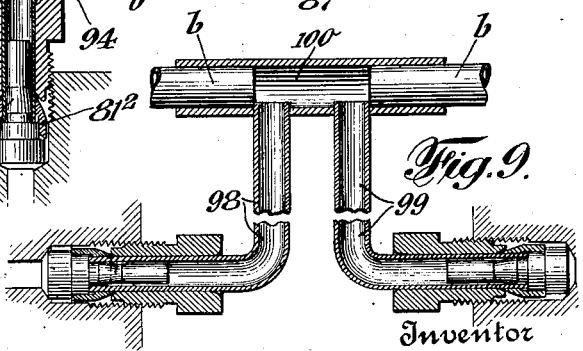

Patented June 7, 1932

1,862,482

UNITED STATES PATENT OFFICE

EDWARD H. KOCHER, OF BOONTON, NEW JERSEY, ASSIGNOR TO AUTO RESEARCH CORPORATION, A CORPORATION OF DELAWARE

LUBRICATING INSTALLATION AND APPARATUS

Application filed March 10, 1926. Serial No. 93,582.

My present invention is concerned with remote control fluid distribution systems, such as that invented by Joseph Bijur, and which is described in United States Patents No. 1,632,771 and No. 1,632,772, and in common with said patented system, provides an installation especially useful for central automobile chassis lubrication.

Among the objects accomplished by the patented system are the elimination of oil or grease cups or other bulky fittings at the various bearings, the operation being effected by a single simple non-selective manipulation for concurrent feed with accurate sub-division among the various outlets through which the system is to emit; the avoidance of any need for manipulation at or near the outlets, whether for initially preparing the system for operation, or for cleaning, or for adjustment; the conversion of a small manual or pedal effort exerted for but a few moments into relatively high line pressure automatically sustained throughout the pipe line, to effect the emission of predetermined quantities of oil through the various distributed outlets, and substantially regardless of the viscosity of the oil; the assurance to the latter end, that the pressure transmitting medium intervening between the source and the outlets remains incompressible at all times, even though the operating manipulation be performed one or more times without a supply of lubricant available, or though the piping system be opened at any one locality as through the destruction of a length of the pipe or of a terminal fitting, or during replacement thereof, for instance, and the inherent indication of a break in the line, or a lack of lubricant in the reservoir without the need for any special alarm devices, gauges or the like.

The primary objects of the present invention are to provide a system of the type mentioned, operating essentially according to the principle of the patented system, and in which the various objects above enumerated as well as other objects are satisfactorily accomplished, with the use, however, of apparatus and parts of simplified construction, at materially reduced cost and diminished bulk, all of which are installed with greater facility and in which the flow-controlling parts of the installed system are inherently protected from mechanical injury.

In my installation, as in that patented to Bijur the lubricant is forced from a supply station into the head of an oil-filled piping system, delivering to various distributed bearings through corresponding outlet terminals, which have associated drip plugs that accordingly emit a combined charge equal to that admitted to the pipe system from the source. The resistance to flow of each drip plug is to great relative to that of the rest of the conduit or line that, as to drip plugs having the larger part as well as to those having little of the conduit resistance between them and the source, the resistance of the drip plug and more especially of the metering passage thereof will substantially determine and control the distribution therethrough during pressure application. The control source, in a preferred application for chassis lubricating use, comprises a reservoir and reciprocating pump assembly affixed at the front of the dashboard, with the pump operating member protruding through the dash, and operable manually or pedally for charging the pump against the resistance of a coil compression spring, the automatic expansion of which exerts a discharging pressure sustained to slowly force the oil through the drip plug terminals.

By my invention, the construction of the drip plug terminals as well as that of the supply installation, as shown in the British patent, have been reorganized, to accomplish the objects previously noted, and while the fullest advantages result from the conjoint use of my supply installation with my drip plugs, the former or the latter alone may be substituted for the corresponding part or parts of the earlier system upon which the present invention is based.

More specific objects of the invention are to provide pipe terminals and more especially flow controlling pipe terminals, composed of few parts of simple construction, all readily completed by automatic machines of standard type, and without the need for handling between successive operation, and quickly assembled without the need for skilled labor.

Among other objects are to provide a terminal of the type referred to, involving a minimum number of parts or sub-assemblies, that may be combined and mounted with ease to produce an operative connection that involves substantially no added bulk, as compared with a pipe terminal devoid of flow control means, and in which the process of application in place results in no twisting or other destructive strains of the pipe and effects a non-leaking connection, even without the use of gasket material.

Another object is to provide a construction of the type mentioned in which the pipe end need not be of any special soft material or be specially treated or shaped in order to effect a non-leaking secure mechanical connection.

Unlike the arrangement which involves the threading of one end of the flow controlling unit into the bearing, and the separate threading of the pipe gripping terminal onto the exposed end of the unit, my pipe gripping terminal element is attached directly to the bearing or other terminal supporting structure rather than to the flow control unit, and the latter is securely confined in a corresponding cavity therefor in the supporting structure.

In a preferred embodiment, the drip plug comprises a small cartridge shell of diameter such as can be readily inserted into the bore of the pipe outlet and having preferably a restriction pin in a longitudinal bore thereof, both pin and bore of accurately predetermined nearly equal diameters as in the patented system, to impose a high resistance to flow therethrough. The pipe outlet is secured to the bearing or other sustaining structure by means of a bushing, preferably a threaded bushing, encircling the same and acting on a compression coupling sleeve to effect a tight joint, said sleeve preferably pressing the pipe wall inward to grip the exterior of the cartridge shell.

A spring-seated relief valve is associated with each pipe outlet and normally seated to prevent flow except under pressure. It is preferable to provide valves of relatively large diameter, the area of which would accordingly, be subjected to greater effective oil pressure during functioning of the system, than would a smaller valve, thus overcoming a substantial spring, which, in turn, is desirable to effect secure seating of the valve. Such large diameter valves could not be inserted in the small diameter pipe bore and to make the cartridge of diameter sufficiently large to accommodate the valve would be inconsistent with inserting it into the pipe end and would, moreover, entail the use of a larger mounting socket and a larger bushing. These objections are all avoided by locating the valve case beyond the end of the pipe, but forming it in a unitary structure with the cartridge part that is inserted into the pipe end.

The drip plug device is not limited in its application to the extremities of the pipe mains, but may be disposed in branches provided in the run of the pipe line, in which case, said branches may be the stems of T fittings secured to the adjacent ends of pipe line segments which they connect, said stems being secured to the corresponding sockets, each by a threaded bushing and compression sleeve.

Other specific objects are to provide a supply installation for a central lubricating system of the type set forth, the reservoir and pump structures of which may be mounted as a unit in front of the dashboard and the operating part of which protrudes through the dashboard and is conveniently actuated by a short pedal stroke to exert a charging effort of multiplied intensity on the pump plunger, so that a powerful discharge spring may be easily stressed thereby, which in its subsequent release effects discharge with the desired high line pressure in the connected piping system.

In a preferred construction of supply installation, the reservoir is formed in a unitary structure with the pump cylinder, which extends contiguous to the side of the unit affixed to the dashboard. The piston rod protrudes through the top of the reservoir for connection with the shorter work end of a lever pivoted near the dashboard to the reservoir top and having a longer power end extending through the dash and formed as a pedal. The pump cylinder has an outlet head which mounts a replaceable filter, against which head the piston normally rests to prevent escape of lubricant from the reservoir in the intervals between operations.

In the accompanying drawings in which are shown one or more of various possible embodiments of the several features of this invention, Fig. 1 is a diagrammatic plan view of an automobile equipped with my apparatus, Fig. 2 is a transverse sectional view of the lubricant supply installation, Fig. 3 is an exploded view of the constituent parts of one of my terminals, Fig. 4 is a transverse sectional view through the assembled terminal, prior to tightening the threaded bushing and on a larger scale.

Fig. 5 is a view similar to Fig. 4 illustrating the relation of the parts after the threaded bushing has been tightened, Fig. 6 is a perspective view of the coupling sleeve, Fig. 7 is a view similar to Fig. 4 showing one of my terminal constructions devoid of a flow controlling means and indicating an alternative location of drip plug, Fig. 8 is a transverse sectional view showing a pipe outlet in the run rather than at the terminal of the line, and, Fig. 9 is a perspective view indicating another application of branch outlet.

In Fig. 1 of the drawings is shown the plan of a motor vehicle chassis, indicating purely diagrammatically some of the various bearings to be supplied from a centralized source, which includes a reservoir R attached in front of the dashboard D and having an operating pedal L accessible from the driver's seat. The reservoir and pump assembly is separately shown on a larger scale in Fig. 2 and will be later described in detail. The piping system is equipped from the reservoir and includes a cross length $c$ connected at its ends to mains $m$ which extend the length of the vehicle and are provided with a plurality of intermediate branch outlets as well as outlets at their ends, which outlets have flow controlling terminals $t$. The conduit for bridging from the frame to the axle, to supply the king pin, tie rod, drag link or other bearings or parts of the axle, is not shown, as this is not essential to a comprehension of my invention. All of the terminals $t$ are preferably provided with flow controlling units or drip plugs of identical construction, one of which to be later described, is separately shown on an enlarged scale in Figs. 3, 4 and 5.

*The reservoir and pump*

Referring now to Fig. 2, the reservoir R is shown as a sheet metal structure composed of a pair of complementary cupped members $r'$ and $r^2$, the edges of which are telescoped and soldered or brazed together at $s$. The metal of the bottom is turned upward about an aperture therethrough to form a rim $d$ upon which rests a shoulder 11' of a pump cylinder 11, which protrudes therebelow and is preferably soldered or brazed in place. The rim $d$ determines a residue trap in the reservoir. Within the cylinder is disposed a piston assembly connected to a piston rod 12, the upper end of which protrudes through a bushing 13, in a corresponding aperture in the top of the reservoir. The reservoir top has a threaded filling neck 14 crimped about a corresponding aperture laterally of the piston rod. The neck is closed by a removable screw cap 15 rendered dust-tight by a yielding gasket 16. A cap 17 is threaded over the lower end of the cylinder 11 and has an outlet socket 18 for attachment of the inlet end of the piping system, which may be affixed by the terminal construction shown in Fig. 7 and described below. The cap presses a gasket washer 19 against the lower edge of the cylinder, this washer constituting a backing for a plunger seating disk 20 centrally perforated at 21 and embossed upward at 22. The rim of the seating disk is contacted by a gasket washer 23 which, in turn, is supported by a sheet metal frame 24, pressed upward by a shoulder 25 in the cap 17 and having an inturned rim 26 encircling and compressing the rim of a filter disk 27. The filter disk is sustained upon an embossed wire mesh screen 28, which, in turn, rests upon the flat inner face 29 of the cap. The screen 28 sustains the filter spaced from face 29, to permit propulsion of lubricant through the entire effective area and without disruptive strains upon the filter material and also preevnts loose hair of the filter felt from being carried into the pipe system with the oil flow.

The piston comprises preferably a metal cup 32 and a leather cup 33 with oppositely facing flanges, said cups reinforced respectively by metallic plates 34 and 35 therein, the metallic cup 32 having a circular groove 36 embossed therein, which in the completed assembly is pressed into the contiguous area of the leather cup.

The piston is attached to the piston rod 12 by a construction comprising a socket or thimble 37 through the end of which the reduced end 38 of the piston rod is inserted and then upset at its protruding extremity as at 39. The piston disk elements 32, 33, 34, 35 are slipped over a hollow screw plug member 40 which is threaded into the socket 37 and has a shoulder 41 by which the inner periphery of the piston assembly is pressed against the extremity of the socket 37.

The outer extremity of the plug 40 is counterbored to accommodate a seating disk 42 of appropriate yielding material such as oil impregnated fiber backed by a metallic disk 43, said parts being secured in place by rolling inward or staking as at 44, the rim of the thin shell formation about the counterbore.

The plug 40 constitutes the cage for a sperical check valve 45, normally resting on the end of an upstanding sustaining pin 46 riveted to disk 43. The socket 37 is provided with radial inlet apertures 48 communicating with the hollow interior of the plug 40 which, in turn, has radial apertures 49 delivering below the piston. The inner end of the screw plug is tapered at 50 to provide a seat against which the ball valve is pressed during discharge stroke of the piston.

Preferably a strainer cup 51 of fine metal mesh extends at its rim between the periphery of the disk 34 and the flange of piston cup 32 and its top encircles thhe piston rod immediately above the socket 37. A coil spring 52 about rod 12 reacts at its upper end against bushing 13 and at its lower against a metal washer 53 about the piston rod, said spring urging the seating face 42 of the piston toward the seating disk 23 and pressing the top of strainer screen 51 against socket 37.

A supporting bracket 54 is centrally riveted or brazed against the reservoir and its wings to engage the dashboard D of the automobile, and are secured thereto by bolts and nuts 55 through the dashboard.

The reservoir is preferably mounted in position such that the pedal lever L which extends back of the dashboard through opening D' may be conveniently depressed by the foot of the seated driver. Lever L is pivoted upon a pin 56 therethrough sustained in ears 57 straddling the lever, said ears being inturned flaps of an upward extension 54' of bracket 54. The working end of the lever is forked at 58 to straddle the protruding end of piston rod 12, and a coil spring 63 encircling the piston rod and reacting against a washer 64, in turn, held in place by the protruding ends of a pin 62 therebelow, urges the fork 58 against the protruding ends 60 of a loose pin transversely through the upper extremity of the piston rod. The upper faces of the fork arms slope longitudinally at 59 and the coacting ends 60 of the upper pin are correspondingly flattened, whereby said pin is locked in place. The spring 63 serves to retain the operating lever against rattling during locomotion of the vehicle.

To assemble the reservoir, the socket 37 is slipped over the reduced end of the rod 12 which is then upset, whereupon the piston elements are clamped in position by the application of the previously assembled valve carrying plug 40. The strainer cup 51 is slipped over the end of the piston rod with its rim held between the washer 34 and the flange of cup 32. The washer 53 and the spring 52 are then passed over the piston rod whereupon the bushing 13 is applied and forced down to compress the spring which is then retained against expansion by applying the cross pin 62.

The piston assembly now described is inserted upper end foremost through the cylinder 11 until the bushing 13 over which the gasket 13' has previously been applied is arrested by the top of the reservoir. Thereupon the outlet plug elements 19, 20, 23, 27 and 29 are successively inserted, the reservoir being inverted for this purpose, and the screw cap 17 is screwed home in which operation the seating disk 20 is pressed against the piston face 42, thereby drawing the piston outward to move the pin 62 from contact with the bushing 13, whereupon the operating lever L is applied.

The reservoir with the lever L previously assembled therto is applied to the dashboard D by passing the lever L through aperture D' from in front of the dash and passing the bolts 55 through the dash and the bracket ears 54.

*Drip plug and terminal constructions*

Referring now to Figs. 3, 4 and 5, the flow controlling terminal devices can be accommodated in a small drilled mounting aperture or socket such as is commonly employed for grease cups or oil cups. Such socket as shown in Fig. 3 when produced by an ordinary drill which has a beveled nose forms an inwardly tapered end or bottom 66.

My flow controlling unit preferably comprises a cartridge C provided with a shank or plug portion telescoped into the end of the pipe $b$ and formed with an enlarged head 67 affording a shoulder 68 abutting against the end of the pipe. The extremity of the head affords a peripheral area of contact with the tapered bottom 66 of the mounting socket. The plugged or telescoped shank of the cartridge is axially bored to accommodate a metering pin 69 affording but minute clearance of a few hundredths of a mm. with respect to said bore to form a highly restricted passage as in the prior Bijur patent, affording a resistance to flow large compared to that incurred in the rest of the pipe line. Preferably the head 67 is formed as a valve casing and has therein a disk valve 70 urged against a rounded smooth seat 71 formed as a unitary part of the cartridge, said valve being normally retained against its seat by the expansive action of a coil spring 72 within the socket which, in turn, is maintained in fixed position by a metal cup 73 centrally perforated at 74 and press-fitted into the head and, moreover, staked at 75. The valve 70 is preferably formed as a metal disk with an oil silk facing 76. The valve in addition to its primary function serves to retain the restriction pin 69 from dropping out of its bore.

The cartridge C is counterbored at the end of its shank to afford a shoulder 78 against which is pressed a fine wire mesh backing disk or cup 79 for a fibrous strainer plug 80 preferably of felt, lodged within the counter bore and retained in place by crimping inward the edge of the counterbore at 80'.

For rendering the terminal secure and assuring an oil-tight passage from the pipe to the bearing, I provide a compression coupling sleeve 81 tightened in position by a bushing 82 which encircles the pipe and is preferably threaded as at 83 into the corresponding tapped socket.

The compression coupling sleeve 81 is tapered at 84 only at its outer end, that is, at the end that comes into direct engagement with the beveled edge 85 of the threaded bushing, said bushing being reduced in diameter at its inner end at 85' in order to spread when the wedging effect of the compression sleeve is exerted thereon, as will appear below. The inner end of sleeve 81 is of the maximum external diameter and rests against a peripheral shoulder 86 formed on the cartridge head, the sleeve being counterbored at said end to fit over the base of the head 67. Preferably the latter end of the compression coupling sleeve is beveled as shown, to form a socket rather than a cone, thereby engaging the shoulder 86 substantially only at the edge of the latter. The beveled edge of the sleeve is preferably mill-knurled, as shown at 87, for firmer engagement thereof with the cartridge unit, the knurls not extending to the extreme end of the sleeve which is continuous as at 87' for a purpose which will appear presently.

For application of the pipe terminal, the threaded bushing 82 and the compression sleeve 81 are slid over the extremity of the pipe and the shank of the cartridge drip plug assembly is inserted into the pipe against the end of which the cartridge head seats. Thereupon the pipe end is inserted into the mounting socket with the protruding valve head of the drip plug bottoming therein. The assembly is completed by simply threading home the bushing 82 with the aid of a wrench, and the parts assume substantially the relation shown in Fig. 5.

The axial pressure applied through the threaded bushing when it is tightened exerts axial pressure upon the coupling sleeve 81 and thereby forces the same against head 67 at shoulder 86 and the end of said head against the socket bottom 66.

Preferably the cartridge shank is tapered at C' in the region adjacent the tapered end of the compression sleeve, so that in tightening the bushing 82, the pipe b which may be of soft metal like copper or of brass, will become constricted at 77 as it is forced inward against the taper C'. The cartridge shank acts as a reinforcing filler to prevent collapse of pipe b under pressure applied through the coupling sleeve. The tapered end of the compression sleeve backed by the constricted pipe length and the tapered cartridge length therein enclosed, exerts a wedging effect on the outer reduced or weakened end of the bushing, which yields and spreads outward as shown at 85' and thus avoids excessive or crushing pressure on the drip plug. The taper C'' of the cartridge shank is of such diameter and rigidity that the enclosed length of bore through the cartridge will not become constricted and the rate of the drip plug will, accordingly, not be reduced in the process of installing. Beyond the compression sleeve, the cartridge may be made of smaller diameter, as shown, and, accordingly, weaker, since no strain is exerted thereon likely to constrict its bore in the course of tightening the bushing.

In the application of the terminal, any tendency for the bushing to carry with it in its rotation the sleeve 81 might cause destructive twisting of the pipe b, to which it is to be wedged. The sleeve is, however, held against such movement, since the effective radius of contact of the bushing therewith is less than that by which the cartridge head is held fixed in the beveled surface 66 of the socket and the mill-knurled end of the sleeve grips the fixed cartridge head and is thus, in turn, secured by the latter against rotary displacement.

Should a pipe length become broken in use, the threaded bushing 82 is simply unscrewed and the cartridge can readily be drawn out substantially intact from the end of the damaged pipe member, the taper of the cartridge readily disengaging from the corresponding taper formed in the pipe. The cartridge being of reduced diameter beyond the taper, the withdrawal of the shank is facilitated.

The flow controlling and valve parts of my flow control terminal are completely protected and substantially enclosed within the terminal socket of the vehicle frame and, accordingly, present no protruding parts likely to be knocked off. The external appearance of the affixed pipe terminal does not indicate the presence of any flow control instrumentality, only the conventional bushing head of the ordinary pipe terminal being visible.

It will be seen that the construction is especially inexpensive both from the standpoint of material and labor and is easy to install. The cartridge shell C is completely formed direct from bar stock by an automatic screw machine, as are also the compression coupling sleeve 81 and the threaded bushing 82. The valve 70 and the cup 73 are simple stampings and the metering pins are cut from wire of appropriate gauge. The pipe end is merely cut square and need not be especially formed or treated.

While the flow controlling cartridge shown and described is preferred, it is understood that in some applications, the valve element thereof may be omitted from the cartridge and in others the restriction metering pin may be omitted, the term "flow controlling" as used in the broader claims being a generic expression, which also embraces measuring valve devices.

Those pipe terminals that are not provided with flow controlling fittings or drip plug units, for instance, the head of the pipe line or pump outlet at 21 or junction fittings or the outlet ends of gravity flow terminal pipe lengths as, for instance, that which may lead to the tie rod bearing from a drip plug terminal located elsewhere, may embody the same compression coupling sleeve unit 81 and the same threaded bushing 82 as the metering terminals just described. In the open terminal construction of Fig. 7 a snugly fitting steel insert or liner 90 is employed as a reinforcing filler in lieu of the cartridge shank of Fig. 4, in order to prevent collapse of the relatively weak pipe due to compression of the coupling sleeve. The liner has an enlarged head 91 abutting the taper shoulder or bottom 92 of the mounting socket as in Fig. 2 and is abutted by the extremity of the pipe $b$. The continuous edge 87' of the beveled end of compression sleeve 81' contacts the socket shoulder on a periphery materially larger than that between the threaded bushing 82' and the tapered edge of the coupling sleeve, so that the operation of threading home the bushing will for the reason previously set forth, result in no rotary or twisting strain upon the metal pipe. A lubricant-tight connection results from the pressure of the continuous edge 87' of the compression sleeve against the socket bottom. The liner 90 could be formed, if desired, in an integral construction with compression sleeve 81' or pre-assembled therewith.

I have illustrated a drip plug cartridge $C^2$, similar to that of Figs. 1, 2 and 3, but cylindrical in exterior, pressed into the bore 92' of the mounting structure and thereby held in position independently of the pipe coupling.

In Fig. 8 is shown a simplified arrangement for applying a drip plug outlet to a bearing in the run of the pipe line. By reference to Fig. 1, it will be seen that the arrangement in Fig. 8 would be employed, for instance, for supplying lubricant from the main to the shackle of the front spring. In this construction, I employ a T fitting made of a length 93 of tubing forming the cross bar and a length 94 at right angles thereto forming the stem, the end of the latter length being inserted through a corresponding hole formed midway between the ends of the cross bar and brazed or soldered in place therein. The stem 94 of the T is preferably of the same diameter, internal and external as that of the lengths of pipe line $b$ and there is applied therein one of the cartridge units C shown in Fig. 4 which is encircled by one of the compression coupling sleeves $81^2$ and secured in position by a threaded bushing $82^2$ of the same construction as that of Fig. 4. The internal diameter of the T cross arm 93 is the same as the external diameter of the lengths of the pipe line $b$ which lengths are telescoped thereinto and brazed in place. The inwardly protruding extremity 96 of the T stem constitutes a stop limiting the insertion of the pipe ends $b$ connected thereat, thereby assuring a sufficient length of engagement and precluding the pipe ends being inserted so far as to restrict the entry port to the T stem. If desired, the branches 94 may be applied direct in the main length of pipe, rather than through a connecting T head.

The stem of the T may be of greater length than shown and bent as desired to reach any bearing not in the immediate neighborhood of the main length of supply conduit, as, for instance, in Fig. 9, where the T is illustratively shown with two stems 98 and 99 formed contiguous to each other in a cross bar member 100 of length greater than that shown in Fig. 8, the connection at the bearing ends being identical with those shown in Figs. 3, 4 and 5.

Operation

For operation, the driver raises his foot slightly and depresses the pedal L to bring the end of the latter inward toward the dashboard, whereupon he lets go. Thereafter slow emission will take place automatically through various drip plug outlets for supplying all of the bearings to which the system is connected.

The pump is contiguous to the dashboard near which the operating lever L is pivoted so that notwithstanding the fact that the pedal is pressed in operation through but a short stroke, say 7 cm. a substantial power multiplication of say 6 to 1 is nevertheless, effected to easily overcome the resistance of the relatively powerful spring 52, the short pedal power arm of lever L being several times longer than the work arm connected to the piston rod.

The pedal end of the operating lever is appropriately curved for convenience of depression, and has a stop nut $n$ that contacts the dashboard to limit the stroke and prevent compression of spring 52 to a column spring. The stroke of the piston being quite short and the bore of the pump cylinder large, as shown, a charge adequate for the multiplicity of bearings is thus ejected by a single pump operation. During the pedal stroke, lubricant in the reservoir R is caused to pass through the strainer 51 and by way of apertures 48 past valve 45 into the chamber below the piston and above the filter disk 27, the reservoir being adequately vented through the crevice between pump rod 12 and bushing 13. When the pedal is then let go, the spring 52 expands by reaction against the bushing 13 and forces the piston downward. At the beginning of the discharge stroke, the rush of oil through the descending piston entrains the valve 45 to its seat 50, the large ports 48 precluding counterpressure that might oppose seating of the valve. Throughout the discharge action, the ball check valve 45 remains seated and prevents return of lubricant from below the piston, and the piston forces the lubricant past the filter disk 27 into the lubricant-filled pipe line. The spring 52 being substantially compressed and relatively powerful, the pump pressure is speedily transmitted through the incompressible column of lubricant throughout the pipe line, causing the relief valve 70 in the drip plugs to crack off their seats.

The minute crevice about the metering pin 69, the valve 70 and the strainer plug 80 of each drip plug impose a combined resistance so high to the flow of lubricant therethrough under pressure, relative to the resistance due to the entire length of pipe line leading thereto, that said drip plugs in themselves are practically controlling of the rate of flow. The drip plug crevice about pin 69 is made so minute as to be in itself largely controlling of the resistance to flow imposed by the drip plug. This arrangement is desirable since the restriction crevice can be very accurately determined, as it is the difference in cross-section of a bore and of a length of wire, both of which are readily made with great precision. Thereby, the substantial variations are permissible which are incurred during ordinary manufacture in the strength of the valve springs 72 and in the compression and, accordingly, in the resistance of the felts 80.

Lubricant is, accordingly, advanced slowly at rates substantially determined by the clearance between the metering pins and the bores of the various drip plugs to pass therefrom on to the bearings. Upon cessation of the pressure at the source, each of the valves 70 is reseated by its spring and further drip is prevented from the pipe line, which remains at all times fully charged with oil. The strainer plugs 80 as in the Bijur patent function to intercept any solid particles such as metal chips or dirt that may be carried from the pipe line with the oil, toward the bearing.

The operation of stressing the spring is not much harder in winter when the oil becomes more viscous than it is in summer when the oil is thinner, but the rate of discharge would vary, the pump taking possibly 20 seconds to 2 minutes to discharge in summer, depending on the grade of oil used, and ten minutes to one hour or more in winter. The spring 52 is preferably highly stressed even in the normal position thereof shown in Fig. 2, so that the pressure exerted thereby is nearly uniform throughout the short pump stroke. A quick return of the pedal is an indication that the reservoir is empty or that there is a break in the pipe line.

The piston face being seated upon the outlet disk of the pump between operations, affords an independent seal against loss of oil from the reservoir. It also seals the head of the line so that if one drip plug valve were defective, oil would yet not escape. It also permits a drip plug to be removed or the pipe line to be opened, without appreciable loss of oil.

As long as the reservoir has a substantial volume of lubricant therein, no air therefrom can enter the pump cylinder. When, however, the level of oil in the reservoir becomes low, so that only air or a frothy mixture of oil and air would enter the pump cylinder, such air or froth will not be forced into the pipe line, since it has too little viscosity to lift the heavy metal valve 45 to its seat. When there is no oil in the cylinder, the valve will remain unseated throughout the piston stroke. If a residue of oil settles at the bottom of the cylinder, the valve will remain open while passing through the level of air or froth and will close in its traverse through the level of oil. The pipe line, accordingly, remains filled with lubricant from the pump outlet clear to all of the drip plug relief valves, even though the pump be stroked one or more times without a change of oil.

By the expression flow obstructing fitting, unit or cartridge as used in the accompanying claims, is meant a unitary assembly adapted to be utilized in connection with a conduit system which contains any one or combination of two or more of the following flow obstructing instrumentalities, namely, a filter or strainer, a valve and/or a metering element such as a restriction. The connection socket may be rigid with the bearing structure and in the illustrated form it is an integral part of the outer element of the bearing structure itself. The flow obstructing instrumentalities or fittings and/or the tapered coupling structure may rest directly upon the ledge at the bottom of the socket or upon a shelf at some other position within said socket. In one embodiment the pipe end or terminal, which preferably is cylindrical, may telescope with the flow obstructing unit and the tightening structure and be firmly and immovably connected therewith. In the form shown the pipe end is telescoped outside of the flow obstructing unit and inside of the tapered tightening structure. Due to the contact of the knurled portion of the coupling sleeve with the flow obstructing unit, such tightening sleeve may for certain cases be considered as an integral part of the flow obstructing unit.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

The subject matter as specifically shown and described but not claimed in the present application and particularly the subject matter of Figs. 8 and 9, are included in copending application Serial No. 506,071, filed January 2, 1931.

I claim:—

1. A pipe terminal comprising a mounting socket, a flow controlling cartridge bottoming in said socket, a cylindrical pipe end in telescoping relation with respect to the outer end of said cartridge, a bushing plugging said socket and a tapered structure encircling said pipe and wedged by said bushing inward to grip said pipe.

2. A pipe terminal comprising a mounting socket, a flow controlling cartridge therein, a cylindrical pipe end in telescoping relation with respect to the outer end of said cartridge, a bushing plugging said socket, and a tapered structure encircling said pipe, associated with said cartridge, said bushing pressing inward against said structure to hold said cartridge against the inner end of said socket, and to wedge said tapered structure inward to grip said pipe.

3. A pipe terminal comprising a mounting socket, a flow controlling cartridge therein, a cylindrical pipe end in telescoping relation with respect to the outer end of said cartridge, said cartridge affording a stop shoulder for the extreme end of said pipe, a bushing threaded into said socket and a tapered structure encircling said pipe, interposed between parts of said bushing and said cartridge, transmitting thrust from said bushing to hold said cartridge against the inner end of said socket, and wedged inward by said bushing to grip said pipe.

4. A pipe terminal comprising a mounting socket, a flow controlling cartridge extending thereinto, a cylindrical pipe end in telescoping relation with respect to the outer end of said cartridge, a bushing about said pipe plugging said socket and a compression coupling sleeve in arrested relationship with respect to said socket, and wedged inward at its outer end by said bushing into gripping engagement with said pipe.

5. A pipe terminal comprising a mounting socket, a flow controlling cartridge extending thereinto, a cylindrical pipe end in telescoping relation with respect to the outer end of said cartridge, a bushing about said pipe and threaded into said socket and a compression coupling sleeve abutting at its inner end a part of said cartridge and engaged at its outer end by a part of said bushing, transmitting thrust from said bushing to hold said cartridge against the inner end of said socket, and wedged inward by said bushing to grip said pipe.

6. A pipe terminal comprising a mounting socket, a flow controlling cartridge extending thereinto, a cylindrical pipe end in telescoping relating with respect to the outer end of said cartridge, said cartridge affording a stop shoulder for the extreme end of said pipe, a bushing about said pipe and threaded into said socket, a compression coupling sleeve pressed by a part of said bushing against an abutment part therefor on said cartridge, and wedged inward by said bushing to grip said pipe.

7. A pipe terminal comprising a mounting socket, a cartridge bottoming in said socket and having a longitudinal restriction pin therein affording small clearance for flow control, a cylindrical pipe end in telescoping relation with respect to the outer end of said cartridge, a bushing plugging said socket, and a tapered structure encircling said pipe and wedged by said bushing inward to grip said pipe.

8. A pipe terminal comprising a mounting socket, a flow controlling cartridge bottoming in said socket and including a spring-seated relief valve, a cylindrical pipe end in telescoping relation with respect to the outer end of said cartridge, a bushing plugging said socket and a tapered structure encircling said pipe and wedged by said bushing inward to grip said pipe.

9. A pipe terminal comprising a mounting socket, a cartridge bottoming in said socket, said cartridge including a longitudinal restriction pin in a corresponding bore of slightly larger diameter and a spring-seated relief valve, a cylindrical pipe end in telescoping relation with respect to the outer end of said cartridge, a bushing threaded into said socket, and a tapered structure encircling said pipe and wedged by said bushing inward to grip said pipe.

10. A pipe terminal comprising a mounting socket, a cartridge bottoming in said socket, said cartridge including a restriction pin extending longitudinally thereof in a corresponding bore to control the flow therethrough, a strainer plug in advance of said pin near the inlet end of said cartridge, a cylindrical pipe end in telescoping relation with the outer end of said cartridge, a bushing threaded into said socket and a tapered structure encircling said pipe and wedged by said bushing inward to grip said pipe.

11. A pipe terminal comprising a mounting socket, a flow controlling cartridge bottoming in said socket, a relief valve extending across said cartridge and normally spring-seated to prevent flow therethrough, a strainer plug in said cartridge in advance of said valve, a cylindrical pipe end in telescoping relation with respect to the outer end of said cartridge, a bushing threaded into said socket and a tapered structure encircling said pipe and wedged by said bushing inward to grip said pipe.

12. A pipe terminal comprising a mounting socket, a cartridge bottoming in said socket, said cartridge including a restriction pin extending longitudinally thereof into a corresponding bore therein to afford a minute flow controlling clearance, a spring-seated relief valve extending across the path of flow and normally seated to prevent such flow, a strainer plug near the inlet end of said cartridge to intercept any solid particles carried with the lubricant, a cylindrical pipe end in telescoping relation with respect to the outer end of the cartridge, a bushing threaded into said socket and a tapered structure encircling said pipe and wedged by said bushing inward to grip said pipe.

13. A flow controlling pipe terminal cartridge of diameter smaller than the mounting socket therefor, having a stop shoulder for the pipe extremity, and having a shoulder for abutment of a pipe-gripping terminal sleeve, said cartridge having a metering pin supported therein and extending longitudinally thereof.

14. In a pipe terminal, in combination, a cartridge extending into a substantially cylindrical pipe bore and having a head against which the end of the pipe abuts, said cartridge having flow restricting means therein and compression coupling means encircling and gripping the pipe end in mounted position.

15. In a flow controlling piping system, in combination, a substantially cylindrical pipe end having a flow controlling restriction unit protruding into the substantially cylindrical end of said pipe and a coupling bushing engaging the exterior of said pipe end and securing it to a mounting support therefor.

16. A pipe terminal comprising a mounting socket, a pipe end extending thereinto, a compression coupling sleeve encircling said pipe end, a bushing threaded into said socket and urging said compression sleeve inward to grip said pipe, and a flow controlling instrumentality having a hard generally cylindrical exterior and fitting into said pipe end and contacting with the sides of said pipe.

17. A pipe terminal comprising a mounting socket, a pipe end extending therethrough, a compression coupling sleeve encircling said pipe end, a compression coupling unit threaded into said socket and urging said compression sleeve inward to grip said pipe and a flow obstructing instrumentality having a generally cylindrical exterior end fitting into said pipe end, said instrumentality consisting of a metal shell fitting within the end of the pipe and provided with a cylindrical bore substantially filled with a metallic pin of nearly the same diameter.

18. In a pipe terminal construction, in combination, a flow controlling unit including a cartridge slipped into the pipe end, a head unitary with said cartridge coaxial therewith, protruding beyond the pipe end and affording a shoulder abutted by the extremity of the pipe, a relief valve in said socket, and a spring therein normally urging said valve to seating position, a restriction pin fitting in a corresponding bore in said cartridge, and means affording a tight connection between said cartridge and the wall of the pipe.

19. In a pipe terminal construction, in combination, a flow controlling unit including a cartridge telescoped into the pipe end and having a shoulder abutting the extremity thereof, a head unitary with said cartridge coaxial therewith and protruding beyond the pipe end, a valve seat in said head, a relief valve in said head and a spring therein normally urging said valve against its seat, a restriction pin fitting in a corresponding bore in said cartridge, a strainer plug near the inlet end of said restriction pin, and means securing said unit with respect to the pipe end.

20. In a pipe terminal, in combination, a flow controlling unit including a cartridge slipped into the pipe end, a head unitary with said cartridge coaxial therewith, protruding beyond the pipe end and affording a shoulder abutting the extremity of the pipe, a relief valve in said head and a spring normally urging said valve to seating position, a restriction pin fitting in a corresponding bore in said cartridge, a mounting socket for said terminal, a compression coupling sleeve encircling said pipe at the region of said restriction pin and a bushing lodged in said socket and adapted to be tightened for wedging said sleeve inward against the pipe.

21. A pipe terminal structure including a mounting socket, a flow controlling cartridge bottoming therein and having a substantial portion thereof telescoped into the end of the pipe, a compression coupling sleeve encircling the end of said pipe and a bushing secured in said socket and tightening said coupling sleeve about the pipe wall and against the cartridge.

22. A pipe terminal structure including a mounting socket therefor, a terminal element having a portion telescoped into the pipe and having a head therebeyond abutting the end of said pipe, and bottoming in said socket, a compression coupling sleeve encircling the end of the pipe and a bushing threaded into said socket and forcing the compression sleeve inward against the pipe, said telescoped portion preventing collapse of the corresponding length of pipe wall.

23. A pipe terminal structure comprising a mounting element having a drilled and tapped socket, a pipe end, a terminal piece having a portion telescoped into said pipe end and having a head therebeyond bottoming in said socket, and forming a stop for the end of the pipe, a compression coupling sleeve, having a part encircling the head beyond said pipe and having a tapered portion encircling the pipe, and a bushing encircling said pipe and threaded into said socket to force the tapered edge of the compression sleeve inward for gripping the pipe wall, one of the parts beyond the compression sleeve constituting a stop for the end thereof opposite said tapered end.

24. A pipe terminal assembly comprising a mounting structure having a drilled and tapped socket with a tapered inner end, a unit telescoped into the pipe end and having a head affording an abutment for the end of the pipe, said head abutting at its outer edge against said tapered end, a compression coupling sleeve having a part encircling the said head and having a tapered part encircling the pipe end, said sleeve being of maximum diameter at its innermost end and abutting the structure therebeyond in said socket along an effective diameter larger than that of the tapered outer end of said sleeve and a bushing encircling the pipe and threaded into the socket and serving to wedge the compression sleeve inward to grip the pipe.

25. A pipe coupling comprising a hard sleeve telescoped into the end of a soft metal pipe and having an enlarged head constituting a stop for the extreme end of the pipe, a drilled and tapped mounting socket in which said head bottoms, a compression coupling sleeve encircling said head and the contiguous end of said pipe and bottoming in said socket, and a threaded bushing encircling the pipe and threaded into said socket and forcing the tapered end of the sleeve inward against the pipe to press the same against the telescoped sleeve therein.

26. Means for affixing a pipe in an ordinary drilled and tapped terminal socket, said means including a terminal piece telescoped into the end of the pipe and having a head serving as an abutment for the extreme end and in turn abutting at its outer edge the tapered inner end of the socket, a compression coupling sleeve having a tapered end encircling the pipe and having a portion therebeyond encircling the head, said sleeve being beveled at its inner end so that the outer edge thereof bottoms in the socket and a bushing threaded into said socket and serving to wedge the tapered end of the sleeve inward to grip the pipe.

27. A pipe terminal comprising a drilled and tapped mounting socket, a flow controlling unit having a portion telescoped into the end of the pipe and a head therebeyond bottoming in the socket, and constituting a stop for the extreme end of the pipe, a compression coupling sleeve encircling the end of the pipe, abutting at its inner end against a part of said head and having a tapered outer portion, and a bushing secured in said socket and forcing the tapered end of the compression sleeve inward to grip the pipe.

28. A pipe terminal assembly comprising a drilled and tapped mounting socket, a flow controlling cartridge assembly including a metering portion telescoped into the end of the pipe and an enlarged head against which the end of the pipe abuts, said head in turn bottoming in the mounting socket, said head having a shoulder intermediate the ends thereof, a compression coupling sleeve having a tapered portion encircling said pipe and abutting at its opposite end against said shoulder, and a bushing encircling said pipe, threaded into said socket and wedging the tapered end of said sleeve inward.

29. A pipe terminal assembly comprising a mounting structure having a drilled and tapped socket therein, a flow controlling cartridge including a shank portion telescoped into the pipe and having therein a metering pin affording small clearance with respect thereto, said cartridge having an enlarged head constituting an abutment for the end of the pipe and in turn bottoming in the socket, a valve enclosed in said enlarged head and having a seat adjacent said metering pin and a coil spring urging said valve against its seat, said head having a peripheral shoulder intermediate its ends, a compression sleeve having a tapered portion encircling said pipe end and abutting at its opposite end against said shoulder, and a bushing encircling said pipe, threaded into said socket and wedging the tapered end of the sleeve inward against the pipe.

30. The combination set forth in claim 29 in which the compression sleeve is beveled at its inner end and mill-knurled at the beveled portion to form a gripping engagement with the outer edge of the shoulder.

31. A pipe terminal assembly comprising a drilled and tapped mounting socket, a flow controlling cartridge having a part telescoped into the end of the pipe and fitting snugly therein near the extremity of the pipe and of slightly reduced diameter therebeyond for clearance with respect to the pipe wall, a metering pin within said telescoped cartridge portion, said cartridge portion being enlarged in diameter beyond said pipe and affording a stop for said pipe end, the opposite end of said head bottoming in the mounting socket, means retaining the restriction pin against dropping out of its bore, a compression sleeve encircling said pipe and a part of said head, and a bushing encircling said sleeve and threaded into said socket for tightening said compression sleeve.

32. In combination, a pipe terminal assembly, including an ordinary drilled and tapped socket, a flow controlling cartridge unit telescoped into the pipe end and having an enlarged head therebeyond constituting an abutment for the extremity of the pipe and in turn abutting at its opposite end against the beveled inner end of the socket, said cartridge fitting snugly within the pipe near the extremity of the latter and being slightly reduced in diameter for clearance with respect to the pipe wall therebeyond, a metering pin longitudinally of said telescoped portion, said enlarged head having a relief valve therein, a seat therefor near the corresponding end of the metering pin, a coil spring within the head normally retaining the valve against the seat and thereby holding the metering pin from dropping out of position, said head having a shoulder between its ends, a compression coupling sleeve having a tapered portion encircling said pipe, the opposite end thereof abutting said shoulder, and a bushing encircling said pipe, threaded into said socket and rendering said coupling sleeve effective.

33. As an article of manufacture, a drip plug cartridge comprising a cylindrical portion of diameter sufficiently small to fit within a pipe, a metering pin therein extending longitudinally thereof, an enlarged head beyond said metering pin and constituting a stop for a pipe end, a spring-seated relief valve within said head constituting a stop for said restriction pin, and a strainer plug at the inlet end of said cartridge.

34. In a piping installation, of the type having a pipe run, with a branch between the ends thereof, and a mounting structure having a drilled socket for the free end of said branch, the combination therewith of a cartridge telescoped into the free end of said branch pipe and having a head bottoming in said socket, a compression coupling sleeve encircling said branch, and a bushing in said socket wedging said coupling sleeve inward to grip said branch.

35. In a pipe installation, of the type having a pipe run with a branch between ends thereof, and a mounting structure having a drilled and tapped socket therein, for the free end of said branch, the combination therewith of a flow controlling cartridge telescoped into said branch and having an enlarged head bottoming in said socket, a compression coupling sleeve encircling said branch and a bushing threaded into said socket and serving to tighten said sleeve about said branch.

36. A pipe terminal including a mounting socket, a generally cylindrical reinforcing fluid-transmitting filler telescoped into said pipe and protruding therebeyond to bottom in said socket, a compression coupling sleeve in said socket having a tapered end encircling said pipe, and a bushing plugging said socket having a bevel about said sleeve end and wedging the latter inward to force said pipe against said filler.

37. A flow controlling pipe terminal comprising a mounting socket, a flow controlling cartridge having a shank extending into the open end of the pipe and having a head against which the extremity of said pipe abuts and which in turn bottoms in said socket, a compression coupling sleeve in said socket having a tapered portion about the end of said pipe, said shank having a taper adjacent said coupling sleeve taper, a bushing in said socket having a beveled inner edge about the tapered end of said sleeve, whereby in tightening said bushing, the edge of said coupling sleeve will be wedged inward to force the pipe against the taper of the cartridge.

38. A pipe terminal comprising in combination, a mounting socket, a flow controlling cartridge including a shank extending into the end of the pipe and having a valve head affording an abutment for said pipe end and in turn bottoming in said socket, a restriction pin extending with minute clearance in a corresponding longitudinal bore through said shank, said shank being of maximum diameter near the extremity of the pipe and being tapered near said extremity, a compression coupling sleeve encircling said pipe and having a taper adjacent the taper of said shank and a threaded bushing in said socket having a bevel extending about the end of the coupling sleeve, whereby in tightening the bushing, the tapered end of the coupling sleeve is wedged inward to force the pipe upon the taper of the enclosed shank.

39. A pipe terminal including a mounting socket, a reinforcing fluid-transmitting filler extending into the extremity of said pipe, a compression coupling sleeve in said socket encircling said pipe, a bushing plugging said socket, beveled at the end of its bore to encircle the edge of the sleeve, the wall of said bushing adjacent said bevel being weakened, whereby in the tightening of said bushing, the coupling sleeve will be wedged inward to force said pipe upon said filler and the weakened end of the bushing will spread outward toward the mounting socket wall.

40. A pipe terminal arrangement comprising a connecting socket, a flow obstructing fitting contacting with the interior of said socket, a cylindrical pipe end in telescoping relation with respect to the outer portion of said fitting, a coupling unit closing said socket and a tapered structure associated with said fitting encircling said pipe and wedged by said unit inward to grip said pipe.

41. A pipe terminal arrangement comprising a ledge connecting socket, a flow obstructing unit therein, a cylindrical pipe end in telescoping relation with the outer end of said unit, a coupling unit closing said socket and a tapered structure encircling said pipe and associated with said fitting, said unit pressing inward against said structure to hold said unit against the ledge in said socket and to wedge said tapered structure inward to grip said pipe.

42. A pipe terminal arrangement comprising a ledged connecting socket, a flow obstructing unit extending thereinto, a cylindrical pipe end in telescoping relation with a portion of said unit, a coupling unit about said pipe threaded into said socket and a compression coupling sleeve firmly connected at its inner end with a part of said flow obstructing unit, engaged at its outer end by a part of said coupling unit, transmitting thrust from said coupling unit to hold said flow obstructing unit against the ledge in said socket and wedged inwardly by said coupling unit to grip said pipe at the outer end of said sleeve.

43. A pipe terminal arrangement comprising a ledged connecting socket, a flow obstructing fitting resting on a ledge in said socket and including a valve and a strainer, a cylindrical pipe end in telescoping relation with respect to a portion of said fitting, a coupling arrangement closing said socket and a tapered structure firmly associated with said fitting, encircling said pipe and wedged by said arrangement inward to grip said pipe.

44. A pipe terminal arrangement comprising a ledged connecting socket, a flow obstructing fitting resting on the ledge in said socket and provided with a central fluid passage, a valve extending across said passage, a strainer in said fitting in advance of said valve, a cylindrical pipe end in telescoping relation with respect to the outer end of said fitting, a coupling unit threaded into said socket and a tapered structure firmly associated with said fitting encircling said pipe and wedged by said unit inward to grip said pipe.

45. A flow obstructing pipe terminal fitting adapted to cooperate with a shelved connecting socket having a stop for the pipe extremity and an abutting portion for contact with the shelf in the interior of the connecting socket, said fitting having a valve and a strainer supported therein in sockets at opposite ends thereof.

46. A pipe terminal arrangement comprising a ledged and tapped connecting socket, a flow obstructing unit telescoped with the end of the pipe and constituting a stop for the extreme end of the pipe and provided with an enlargement lodged on the ledge in the socket, compression coupling means encircling the end of the pipe and firmly associated at its inner end with said enlargement and having a tapered outer portion and a coupling unit secured to the threaded portion of said socket and forcing the tapered end of the compression coupling portion inward to grip the pipe.

47. A pipe terminal arrangement including a ledged connecting socket, a fluid-transmitting filler telescoped with said pipe and extending therebeyond to rest upon a ledge in said socket, a compression coupling structure in said socket associated with said filler having a tapered end encircling said pipe and a coupling unit closing said socket having a bevel contacting with said structure and wedging the latter inward to make a substantially permanent connection between said pipe and said filler.

48. A pipe terminal arrangement comprising a pipe end, a ledged and tapped socket, a fitting having a portion telescoping with the pipe end and affording an abutment for said pipe end, said telescoping portion being of decreasing diameter in the direction away from the bottom of the socket and a wedging coupling means in said socket to grip said telescoping portion and said pipe extremity together.

49. In combination with a cylindrical conduit terminal construction, a cylindrical flow obstructing cartridge-like unit adapted to be slipped into and contact with the interior wall of the cylindrical conduit end, a socket in said unit, a valve in said socket, a restriction plug fitting in a corresponding bore in said unit and means to afford a tight connection between said unit and the wall of the conduit.

50. In combination with a cylindrical conduit terminal construction, a flow obstructing cartridge-like unit telescoped into the conduit end and having an expanded portion contacting with the extremity thereof, a head unitary and co-axial with said unit and positioned at the extremity of the conduit, a valve seat in said head, a valve in said head and a restriction plug fitting in and restricting a bore in said unit.

51. A conduit terminal assembly comprising a flow obstructing cartridge telescoped into the end of the conduit and fitting snugly therein near the extremity of the conduit and of slightly reduced diameter therebeyond for clearance with respect to the conduit wall, a restriction plug within said telescoped cartridge portion and means retaining the restriction plug firmly therein.

52. In combination with a pipe terminal, a connecting socket with an interior ledge, a flow obstructing unit including a fitting telescoping with the pipe terminal and affording a shoulder contacting with said ledge, a valve in said fitting and a coupling unit lodged in said socket and adapted to be tightened to clamp said fitting and said pipe terminal together and to press the shoulder of said fitting against said ledge, said fitting being within said socket and below the outlet thereof.

53. In combination with a pipe terminal, a connecting socket with an interior ledge, a flow obstructing unit including a fitting telescoping with the pipe terminal and affording a shoulder contacting with said ledge, a valve in said fitting and a coupling unit lodged in said socket and adapted to be tightened to clamp said fitting and said pipe terminal together and to press the shoulder of said fitting against said ledge, said fitting being within said socket and below the outlet thereof, the radius of contact of the shoulder and the ledge being greater than the radius of clamping.

54. A pipe terminal structure including a ledged connecting socket, a flow controlling fitting resting on the ledge therein and having a substantial portion thereof telescoped with the end of the pipe, a compression tapered coupling structure encircling the end of said pipe and firmly associated with said fitting and a coupling unit secured in said socket, the inner edge of which is adapted to tighten said coupling structure about the pipe wall.

55. A pipe terminal structure including a ledged connecting socket, a flow controlling fitting resting on the ledge therein and having a substantial portion thereof telescoped with the end of the pipe, a compression tapered coupling structure encircling the end of said pipe and firmly associated with said fitting and a coupling unit secured in said socket, the inner edge of which is adapted to tighten said coupling structure about the pipe wall, said fitting being provided with an enlarged portion which contacts with said ledge.

56. A pipe terminal arrangement comprising a connecting socket provided with a sloping ledge, a flow obstructing fitting having a portion contacting with said ledge with a substantially linear contact, a cylindrical pipe terminal in telescoping relationship with respect to the end of said fitting, a coupling unit closing said socket and a tapered structure associated with said fitting and encircling said pipe, said tapered structure contacting with an inner part of said unit with a substantially linear contact, the former linear contact being at a greater distance from the axis of the fitting than the latter linear contact.

57. A pipe terminal arrangement comprising an element carrying a threaded and ledged connecting socket, a pipe end in arrested relationship in respect to the ledge of said socket, a coupling nut screwed into connection with the outer threaded portion of said socket and a coupling sleeve closely encircling said pipe end between and in arrested relationship in respect to said ledge and said nut, said coupling sleeve being provided with inside and outside frustro-conical end portions both of decreasing diameter generally in the same direction from the maximum sleeve diameter inwardly toward the axis of the socket and outwardly toward the nut, whereby the outside frustro-conical sleeve portion will contact with the nut at its portion nearest the axis while the inside frustro-conical sleeve portion will be arrested in respect to the socket at its portion farthest from the axis.

58. A pipe terminal arrangement comprising an element carrying a threaded and ledged connecting socket, a pipe end in arrested relationship in respect to the ledge of said socket, a coupling nut screwed into connection with the outer threaded portion of said socket, a coupling sleeve closely encircling said pipe end between and in arrested relationship in respect to said ledge and said nut, said coupling sleeve being provided with inside and outside frusto-conical end portions both of decreasing diameter generally in the same direction from the maximum sleeve diameter inwardly toward the axis of the socket and outwardly toward the nut, whereby the outside frustro-conical sleeve portion will contact with the nut at its portion nearest the axis while the inside frustro-conical sleeve portion will be arrested in respect to the socket at its portion farthest from the axis, and an annular insert, said pipe end and said coupling sleeve being directly bottomed upon said annular insert, and said insert being in turn bottomed upon the ledge of the socket, and having a portion of reduced diameter which is telescoped within the pipe end.

59. A pipe terminal arrangement comprising an element carrying a threaded and ledged connecting socket, a pipe end in arrested relationship in respect to the ledge of said socket, a coupling nut screwed into connection with the outer threaded portion of said socket, a coupling sleeve closely encircling said pipe end between and in arrested relationship in respect to said ledge and said nut, said coupling sleeve being provided with inside and outside frustro-conical end portions both of decreasing diameter generally in the same direction from the maximum sleeve diameter inwardly toward the axis of the socket and outwardly toward the nut, whereby the outside frustro-conical sleeve portion will contact with the nut at its portion nearest the axis while the inside frustro-conical sleeve portion will be arrested in respect to the socket at its portion farthest from the axis, and an annular insert, said pipe end being bottomed upon said annular insert, said insert being in turn bottomed upon said ledge and said sleeve encircling said insert and pipe end and being also bottomed upon said ledge.

60. A pipe terminal arrangement comprising an element carrying a threaded and ledged connecting socket, a pipe end in arrested relationship in respect to the ledge of said socket, a coupling nut screwed into connection with the outer threaded portion of said socket and a coupling sleeve closely encircling said pipe end between and in arrested relationship in respect to said ledge and said nut, said coupling sleeve being provided with inside and outside frustro-conical end portions both of decreasing diameter generally in the same direction from the maximum sleeve diameter inwardly toward the axis of the socket and outwardly toward the nut, whereby the outside frustro-conical sleeve portion will contact with the nut at its portion nearest the axis while the inside frustro-conical sleeve portion will be arrested in respect to the socket at its portion farthest from the axis, the inner and outer portions of said coupling sleeve between said frustro-conical portions being substantially cylindrical and concentric with the pipe end.

61. A pipe terminal arrangement comprising an element carrying a threaded and ledged connecting socket, a pipe end in arrested relationship in respect to the ledge of said socket, a coupling nut screwed into connection with the outer threaded portion of said socket and a coupling sleeve closely encircling said pipe end between and in arrested relationship in respect to said ledge and said nut, said coupling sleeve being provided with inside and outside frustro-conical end portions both of decreasing diameter generally in the same direction from the maximum sleeve diameter inwardly toward the axis of the socket and outwardly toward the nut, whereby the outside frustro-conical sleeve portion will contact with the nut at its portion nearest the axis while the inside frustro-conical sleeve portion will be arrested in respect to the socket at its portion farthest from the axis, the inside frustro-conical portion of said coupling sleeve being knurled.

62. A bearing outlet for a centralized lubricating system including a bore with a terminal socket in the mounting structure, a compression coupling sleeve in said socket encircling the pipe end and a bushing plugging said socket and tightening said sleeve with respect to said pipe, and a flow controlling cartridge tightly plugged in the bore within the mounting structure.

63. A bearing outlet for a centralized lubricating system including a bore with a terminal socket in the mounting structure, and having a beveled inner end, a flow restricting cartridge assembly plugged in the bore beyond said socket, a steel liner within the end of said pipe, having a head therebeyond bottoming in said socket, beyond said cartridge and serving as a stop for the extremity of the pipe, a compression sleeve about said pipe end and said head, bottoming in said socket and a bushing threaded into said socket and serving to tighten said sleeve against said pipe.

64. A bearing outlet for a centralized lubricating system including a pipe end, a bore with a terminal socket in the mounting structure, compression coupling means in said socket about the pipe end and a bushing plugging said socket and tightening said pipe with respect to said means, and a flow controlling cartridge tightly plugged in the bore within the mounting structure.

Signed at New York, in the county of New York and State of New York, this 3rd day of March, A. D. 1926.

EDWARD H. KOCHER.